(12) United States Patent
Lum

(10) Patent No.: US 7,949,567 B2
(45) Date of Patent: May 24, 2011

(54) INTEGRATED INTERFACE APPARATUS FOR POINT-OF-SALE SYSTEM

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 0 days.

(21) Appl. No.: 12/388,244

(22) Filed: Feb. 18, 2009

(65) Prior Publication Data
US 2009/0210309 A1   Aug. 20, 2009

Related U.S. Application Data

(60) Provisional application No. 61/029,763, filed on Feb. 19, 2008.

(51) Int. Cl.
*G06Q 20/00* (2006.01)

(52) U.S. Cl. ............ 705/17; 705/16; 235/379; 235/381; 235/383; 345/211; D18/12.3; D18/4.1

(58) Field of Classification Search .................. None
See application file for complete search history.

(56) References Cited

U.S. PATENT DOCUMENTS

| | | | | |
|---|---|---|---|---|
| 4,836,486 A | * | 6/1989 | Vossoughi et al. | 248/281.11 |
| 5,918,841 A | * | 7/1999 | Sweere et al. | 248/123.11 |
| D425,036 S | * | 5/2000 | Copus et al. | D14/375 |
| 6,272,529 B1 | * | 8/2001 | Lum | 709/203 |
| D462,983 S | * | 9/2002 | Lum | D18/12.3 |
| 6,550,582 B2 | * | 4/2003 | Addy et al. | 186/61 |
| 7,073,765 B2 | * | 7/2006 | Newkirk | 248/647 |
| 7,309,003 B2 | * | 12/2007 | Algiene et al. | 235/379 |
| D579,886 S | * | 11/2008 | Calverley | D14/126 |
| 7,475,811 B2 | * | 1/2009 | Jackman et al. | 235/380 |
| D587,296 S | * | 2/2009 | Kuramochi | D18/4.5 |
| D587,747 S | * | 3/2009 | Hubler | D18/35.1 |
| D588,186 S | * | 3/2009 | Yamakawa | D18/4.5 |
| D588,630 S | * | 3/2009 | Erzen et al. | D18/4.6 |
| D590,626 S | * | 4/2009 | Sato | D6/402 |
| D590,828 S | * | 4/2009 | Sherrod et al. | D14/385 |
| D594,055 S | * | 6/2009 | Hagiwara et al. | D18/4.5 |
| 7,676,396 B1 | * | 3/2010 | White | 705/24 |
| 7,735,266 B2 | * | 6/2010 | Gallant et al. | 52/36.4 |
| 2006/0022970 A1 | * | 2/2006 | Lum | 345/211 |
| 2006/0065724 A1 | * | 3/2006 | Lum | 235/383 |
| 2006/0226224 A1 | * | 10/2006 | Henry | 235/449 |
| 2006/0283960 A1 | * | 12/2006 | Top | 235/492 |
| 2009/0138366 A1 | * | 5/2009 | Bemmel et al. | 705/17 |

* cited by examiner

*Primary Examiner* — F. Ryan Zeender
*Assistant Examiner* — Fateh M Obaid
(74) *Attorney, Agent, or Firm* — Hoffman & Baron, LLP (57) ABSTRACT

An example integrated interface apparatus for a point-of-sale system and an example point-of-sale system including the integrated interface apparatus have been disclosed. The integrated interface apparatus includes a base member, a vertical arm member, a display device and a data input device. The base member is configured to be disposed on a counter. The vertical arm member is operatively connected to the base member. The vertical arm member includes a terminal attachment member and a side attachment member below the terminal attachment member. The display device is operatively connected to the terminal attachment member and the data input device is operatively connected to the side attachment member.

19 Claims, 8 Drawing Sheets

INTEGRATED INTERFACE APPARATUS FOR POINT-OF-SALE SYSTEM

CROSS REFERENCE TO RELATED APPLICATION

This application claims the benefit of U.S. Provisional Application No. 61/029,763, entitled "Point-of-Sale Customer Display with Contactless Reader" and filed Feb. 19, 2008, the disclosure of which is incorporated herein by reference in its entirety.

TECHNICAL FIELD

The present application relates generally to point-of-sale (POS) systems. More specifically, the present application is directed to an integrated interface apparatus for a POS system configured to interface a plurality of interface devices with the POS system.

BACKGROUND

Magnetic stripe readers have been used extensively to read common credit cards that include magnetic stripes (i.e., magnetic stripe cards). Magnetic stripes incorporate encoded data to make cashless payment possible.

There are a few undesirable characteristics associated with magnetic stripe cards. For example, the magnetic stripe of the card can wear out after multiple swipes. In addition, the magnetic stripe card provides poor security because it can easily be duplicated and in many cases the card holder is required to hand the magnetic stripe card to a cashier. Often, multiple swipes are required to achieve a successful read because a successful read depends on the speed of magnetic stripe card swipe, the direction of the magnetic stripe card swipe, a swipe with the correct side of the magnetic stripe card, and the surface condition of the magnetic stripe. Furthermore, the encoded data can be erased easily when the magnetic stripe card is in the proximity of electronic and/or magnetic material.

The popularity of magnetic stripe cards is attributable to their low cost. In the past 20 years, smart cards have gained popularity in both Europe and Asia. However, smart cards are very expensive when compared with the magnetic stripe cards. At least for this reason, smart cards have not been well received in the United States. Furthermore, the output data format of a smart card reader is incompatible with the output data format of a magnetic card reader.

Recently, contactless cards and contactless card readers have gained popularity in cashless payment. There are some desirable characteristics associated with contactless cards. For example, the contactless card does not wear out because there is no contact between the contactless card and the contactless card reader. In addition, the contactless card provides a higher level of security than the magnetic stripe card because the contactless card cannot be duplicated easily, the contactless card provides dynamic encryption, and the contactless card holder simply holds the contactless card adjacent the contactless card reader without passing the contactless card to a cashier. The contactless card can be read more quickly than the magnetic stripe card. A successful read of a contactless card is independent of the contactless card orientation and speed of approach to the contactless card reader. Furthermore, data encoded on the contactless card cannot be corrupted by proximity of the contactless card to electronic and/or magnetic devices.

In the United States, magnetic stripe cards and magnetic stripe readers are being replaced by contactless cards and contactless card readers, bypassing smart card technology that is significantly more complex, incompatible and costly. To facilitate this transition, the output data format of contactless readers was made compatible with the output data format of magnetic stripe readers. Thus, the conventional credit card verification system has been preserved. All major credit card issuers have now accepted contactless card technology. Contactless cards and contactless card readers have also been adopted by many merchants.

The current contactless card reader is a desktop terminal that is disposed on a point-of-sale counter in a substantially horizontal orientation. The contactless card reader may include a magnetic stripe reader to read legacy magnetic stripe cards and a dedicated display device to prompt a card holder during various steps of the reading process. The messages displayed by the display device may include "Present Card", "Processing", and "Thank You".

In point-of-sale (POS) applications, the desktop contactless card reader has several drawbacks. For example, the desktop contactless card reader takes up crowded point-of-sale counter space. The desktop contactless card reader can be removed and stolen easily. The desktop contactless card reader requires an additional connection to a POS computing device. The desktop contactless card reader requires a dedicated display device to prompt a customer in making cashless payment.

SUMMARY

In accordance with an embodiment, an integrated interface apparatus of a point-of-sale system is disclosed. The integrated interface apparatus includes a base member, a vertical arm member, a display device and a data input device. The base member is configured to be disposed on a counter. The vertical arm member is operatively connected to the base member. The vertical arm member includes a terminal attachment member and a side attachment member below the terminal attachment member. The display device is operatively connected to the terminal attachment member and the data input device is operatively connected to the side attachment member.

In accordance with a further embodiment, a point-of-sale system is disclosed. The point of sale system includes an integrated interface apparatus and a point-of-sale computing device. The integrated interface apparatus includes a base member, a vertical arm member, a display device and a data input device. The base member is configured to be disposed on a counter. The vertical arm member is operatively connected to the base member. The vertical arm member includes a terminal attachment member and a side attachment member below the terminal attachment member. The display device is operatively connected to the terminal attachment member and the data input device is operatively connected to the side attachment member. The point-of-sale computing device is operatively connected to the display device and the data input device.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

An integrated interface apparatus for a point-of-sale system, an example point-of-sale system including the integrated interface apparatus, an example method and a computer-readable storage medium for performing a point-of-transaction are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
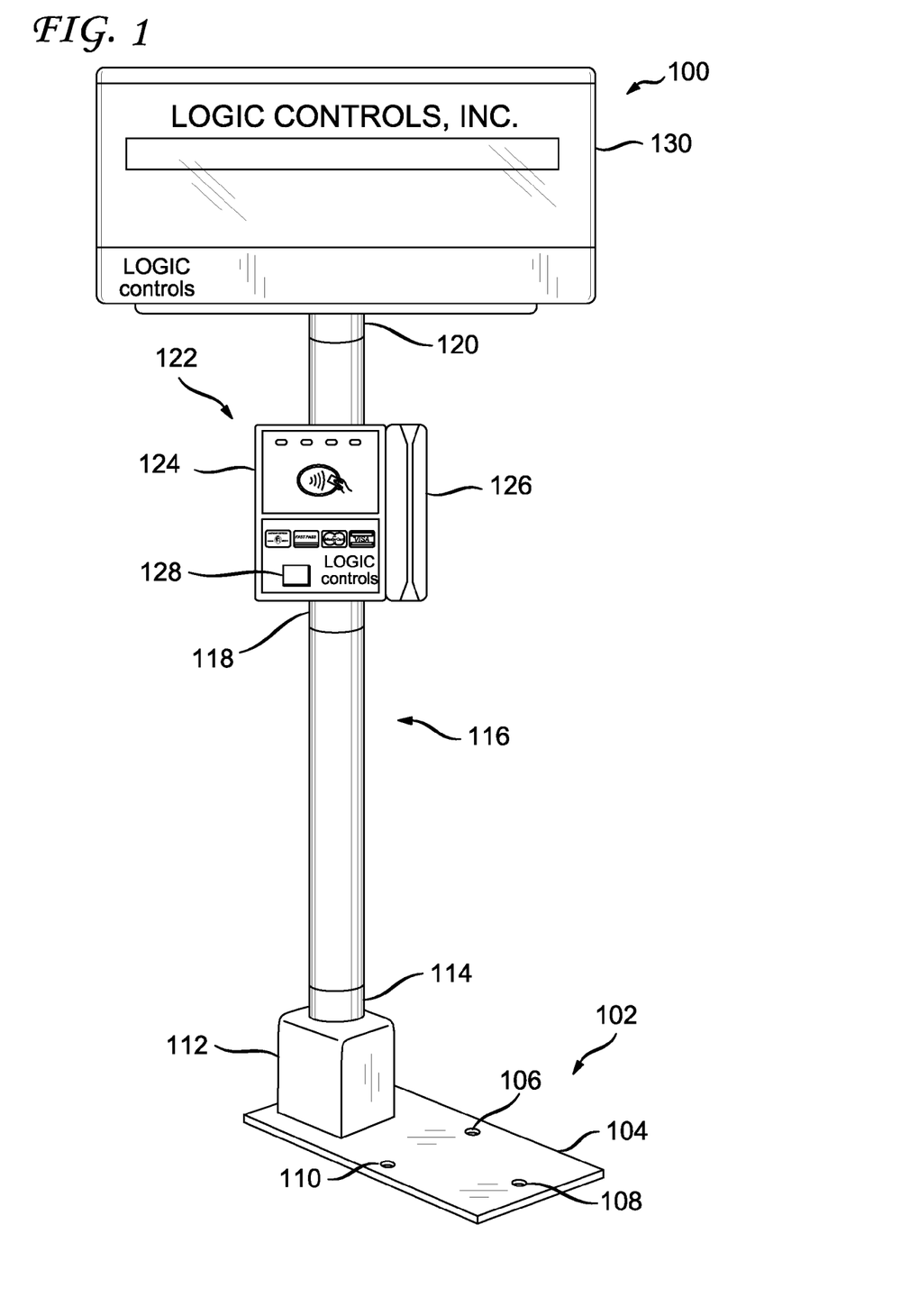
FIG. 1 illustrates a first embodiment of an example integrated interface apparatus of a point-of-sale system.

FIG. 1 illustrates a first embodiment of an example integrated interface apparatus 100 of a point-of-sale system. The example integrated interface apparatus 100 is configured to be disposed on a sales counter associated with a point-of-sale system and the example integrated interface apparatus 100 is further configured to be in operational communication with the point-of-sale system. The example integrated interface apparatus 100 is also configured to minimize a footprint of the integrated interface apparatus 100 on the sales counter. The example integrated interface apparatus 100 is configured to receive input data from a user in association with a transaction (e.g., cashless payment/refund), to communicate the input data for data verification, and to display information, including information associated with the items being purchased/refunded, information associated with the input data, and other related information. The input data may be account data associated with or stored on a magnetic stripe card or a contactless card. Alternatively, the input data may be biometric data (e.g., fingerprint data). The biometric data or account data associated with biometric data may be verified for the transaction.

The example integrated interface apparatus 100 includes a base member 102, a vertical arm member 116, an integrated data input device 122, and a display device 130. The base member 102 is configured to be disposed on a sales counter associated with the point-of-sale system and the base member 102 is further configured to provide structural stability and theft deterrence to the example integrated interface apparatus 100. More specifically, the base member 102 includes a flat rectangular plate 104 and a vertical arm receiving member 112. The flat rectangular plate 104 includes a plurality of through-holes 106, 108, 110 to secure the integrated interface apparatus 100 to the sales counter using fasteners, bolts, screws, or other conventional fasteners. The secured flat rectangular plate 104 provides structural stability and theft deterrence.

The vertical arm receiving member 112 is configured to operatively connect to or couple (e.g., receive and secure) the vertical arm member 116, to provide for rotation of the vertical arm member 116 about a vertical axis of the vertical arm receiving member 112, and provide for vertical travel of the vertical arm 116 in relation to the vertical arm receiving member 112. More specifically, the vertical arm receiving member 112 includes a recess 114 configured to receive the vertical arm member 116. The recess 114 may have a circular configuration. Other configurations are possible. The vertical arm receiving member 112 may also include a snap-in device (not shown) configured to secure the vertical arm member 116 in the recess 114 of the vertical arm receiving member 112 in different vertical positions, allowing vertical travel and rotation of the vertical arm member 16 in relation to the vertical arm receiving member 112. Alternatively, the vertical arm member 116 may be secured to the vertical arm receiving member 112 in different vertical and rotational positions using other fasteners configured to secure the vertical arm member 116 in the recess 114 of the vertical arm receiving member 112, such as bolts, screws, or other conventional fasteners.

The vertical arm member 116 is operatively connected to the base member 102, as described above. The vertical arm member 116 is an elongated tubular member that extends substantially vertically from the base member 102. The vertical arm member 116 includes a side attachment member 118 and a terminal attachment member 120, which are configured to operatively connect to (e.g., receive and secure) respective interface devices. More specifically, the terminal attachment member 120 is configured to operatively connect to an interface device, such as display device 130. The display device 130 is configured to be substantially vertically oriented. The terminal attachment member 120 and the side attachment member 118 are further configured to rotate about an axis of the vertical arm member 116 and to tilt (forward/backward) in relation to the vertical arm member 116, enabling adjustment of the display device 130 and the integrated data input device 122 in relation to the axis of the vertical arm member 116. The side attachment member 118 is disposed below the terminal attachment member 120 and is configured to operatively connect to an interface device, such as the integrated data input device 122. The integrated data input device 122 includes a contactless card reader 124, a magnetic strip card reader 126 and a biometric device, such as a fingerprint reader 128. The integrated data input device 122 is also configured to be substantially vertically oriented.

The vertical arm member 116 is configured to have a height to reduce the crowding on the sales counter of the point-of-sale system, while providing improved eye-level visibility and access to the integrated data input device 122 and the display device 130. Furthermore, the side attachment member 118 may be secured to the vertical arm member 116 at different heights or may be monolithic (one-piece) with the vertical arm member 116 at a particular height to provide better visibility and access to the user.

In operation, the integrated data input device 122 (including interface devices 124, 126, 128) and the display device 130 of the integrated interface apparatus 100 are operatively connected to a point-of-sale (POS) computing device, as will be described in greater detail with reference to FIGS. 5-7 below. The interface devices 124, 126, 128, 130 may be operatively connected to the POS computing device (host) via a data interface device, such as a universal serial bus (USB) hub. The data interface device may be disposed within the integrated interface apparatus 100. The interface devices 124, 126, 128, 130 may also be independently connected to the POS computing device.

As will be described in greater detail below, the POS computing device is configured to receive input data associated with a transaction (purchase/refund) from the integrated interface device 122 (e.g., resulting from a user inputting contactless card data, magnetic card data, biometric data, or other receivable input data associated with the transaction). The POS computing device is also configured to provide the user, via the display device 130, with user-level transaction information that includes information concerning inputting of input data (e.g., prompting and other information associated with the input data) as well as information concerning the transaction (e.g. item stock no., description of item, price of item, and other user-level transaction-related information). The POS computing device is further configured to verify the input data for the transaction (e.g. contactless card or magnetic stripe card verification, and/or biometric verification), such as by contacting a verification device (not shown) that may be local or remote to the POS computing device via a communication link, such as a computer network (not shown).

Figure 2:
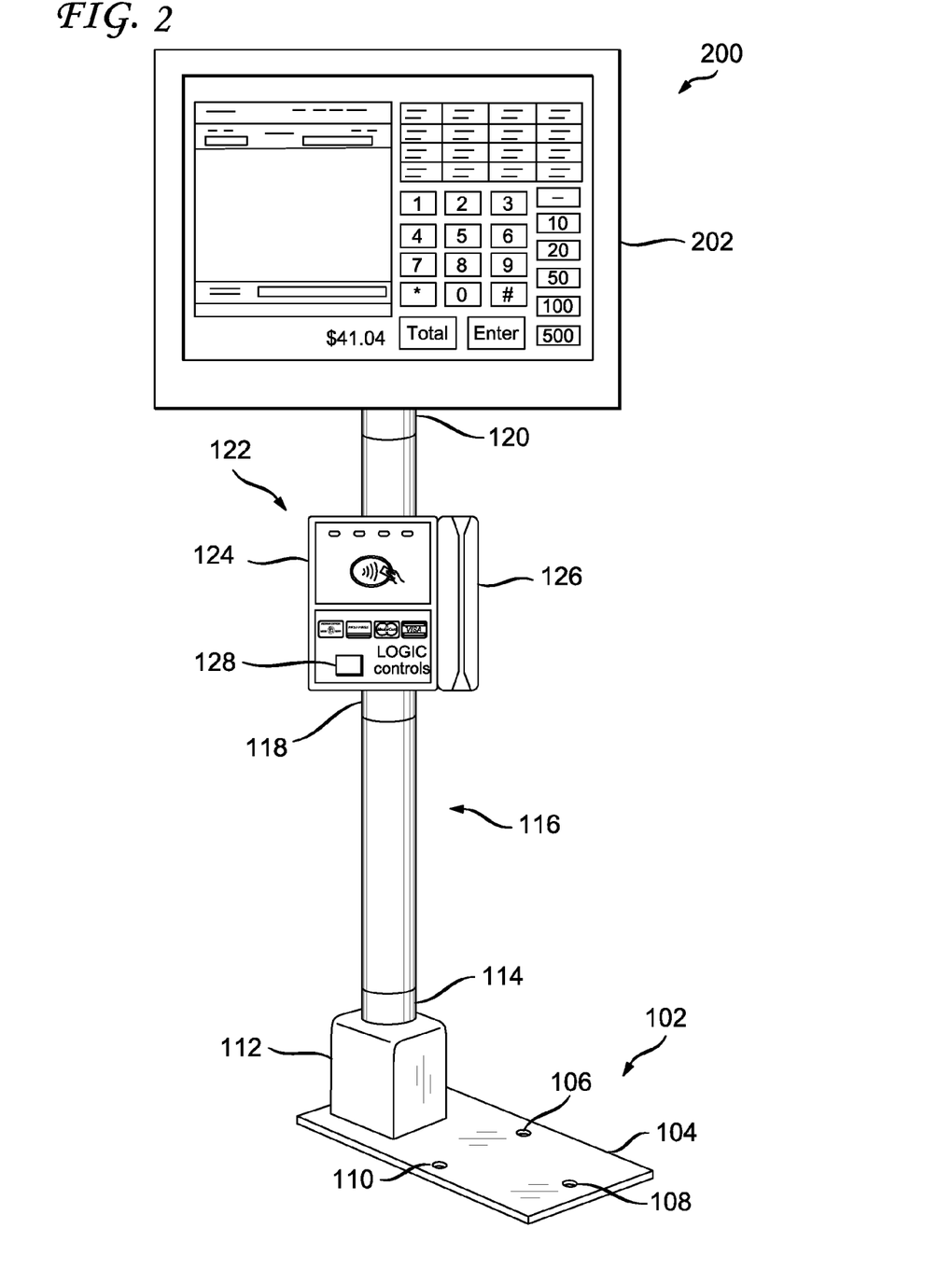
FIG. 2 illustrates a second embodiment of an example integrated interface apparatus of a point-of-sale system.

FIG. 2 illustrates a second embodiment of an example integrated interface apparatus 200 of a point-of-sale system. The example integrated interface apparatus 200 is similar to the example integrated interface apparatus 100 of FIG. 1. The example integrated interface apparatus 200 includes a display device 202 that is configured to display cashier-level transaction information. Cashier-level information may include some or all of the user-level transaction information, as well as cashier-specific transaction information. The cashier-specific transaction information may include information pertinent to a cashier's entering of information related to the transaction (e.g., items being purchased/returned) and to the payment data (e.g., forms of payment). Other information may be displayed such as advertisement information, rebate information, and other transaction related information. The display device 202 may be operatively connected to the POS computing device (host) via the data interface device (e.g. USB hub) through which other interface devices 124, 126, 128 are connected to the POS computing device (host). The display device 202 may also be independently connected to the POS computing device. The vertical arm member 116 is configured to have a height that reduces the crowding on the sales counter of the point-of-sale system, while providing improved eye-level visibility and access to the integrated data input device 122 and display device 202.

Figure 3:
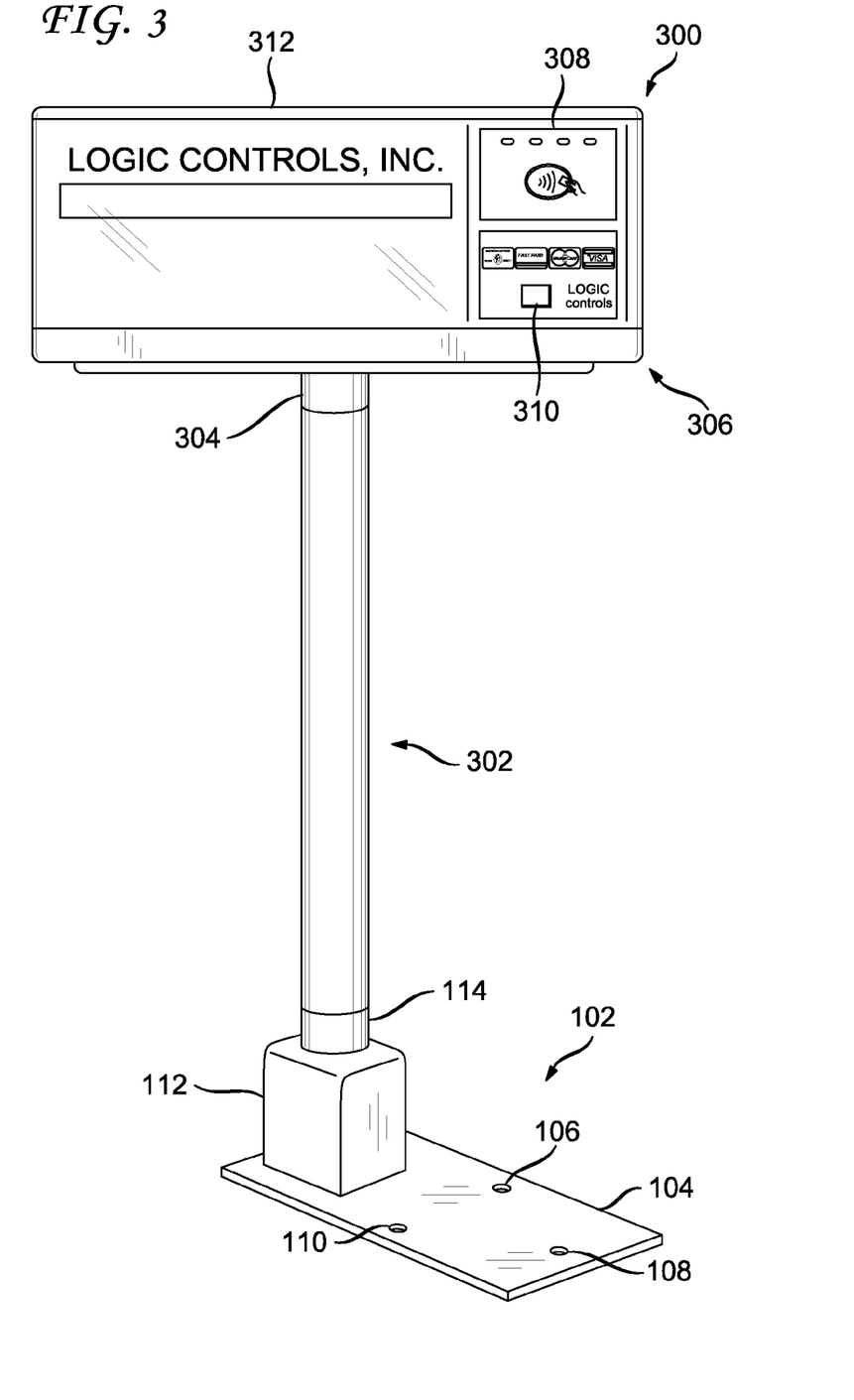
FIG. 3 illustrates a third embodiment of an example integrated interface apparatus of a point-of-sale system.

FIG. 3 illustrates a third embodiment of an example integrated interface apparatus 300 of a point-of-sale system. The example apparatus 300 is similar to the example apparatus 100 of FIG. 1. In the example apparatus 200, a vertical arm member 302 includes a terminal attachment member 304 configured to operatively connect to (e.g. receive and secure) an integrated interface device, such as integrated interface device 306. The terminal attachment member 304 is further configured to rotate about an axis of the vertical arm member 302, enabling adjustment of the integrated interface device 306 about the axis of the vertical arm member 116. The vertical arm member 302 is configured to have a height that reduces crowding on the sales counter of the point-of-sale system, while providing improved eye-level visibility and access to the integrated interface device 306.

The integrated interface device 306 includes a plurality of interface devices, such as a contactless card reader 308, a biometric device 310 (e.g., fingerprint reader) and a display device 312. The interface devices 308, 310, 312 may be operatively connected to the POS computing device (host) via a data interface device, such as a universal serial bus (USB) hub. The data interface device may be disposed within the integrated interface apparatus 300. The interface devices 308, 310, 312 may also be independently connected to the POS computing device.

Figure 4:
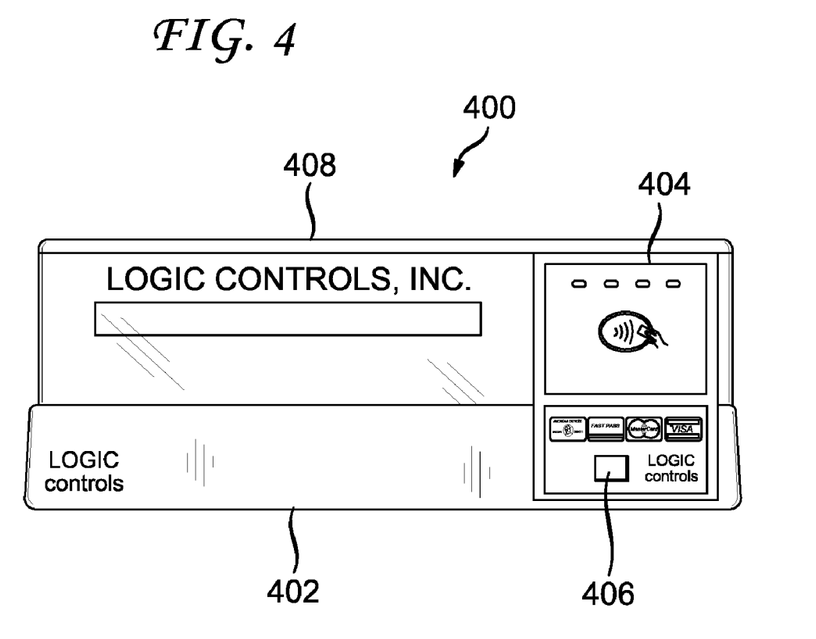
FIG. 4 illustrates a fourth embodiment of an example integrated interface apparatus of a point-of-sale system.

FIG. 4 illustrates a fourth embodiment of an example integrated interface apparatus 400 of a point-of-sale system. The example integrated interface apparatus 400 is similar to the example integrated interface device 306 of the example integrated interface apparatus 300 illustrated in FIG. 3. The example integrated interface apparatus 400 is a desktop apparatus that is configured to be disposed on a sales counter. The integrated interface apparatus 400 includes a housing 402 configured to provide structural stability on the sales counter. The integrated interface apparatus 400 further includes a plurality of interface devices, such as a contactless card reader 404, a biometric device 406 (e.g., fingerprint reader) and a display device 408 supported by the housing 402. The interface devices 404, 406, 408 are substantially vertically oriented.

The interface devices 404, 406, 408 may be operatively connected to the POS computing device (host) via a data interface device, such as a universal serial bus (USB) hub. The data interface device may be disposed within the housing 402 of integrated interface apparatus 400. The interface devices 404, 406, 408 may also be independently connected to the POS computing device. An additional interface device may be integrated in the integrated interface apparatus 400. More specifically, a magnetic stripe card reader may be integrated on the side of the integrated interface apparatus 400, adjacent to the contactless card reader 404 and the biometric reader 406. Other integration locations of the magnetic stripe card reader with respect to the interface devices 404, 406, 408 are also possible and are contemplated in this embodiment.

Figure 5:
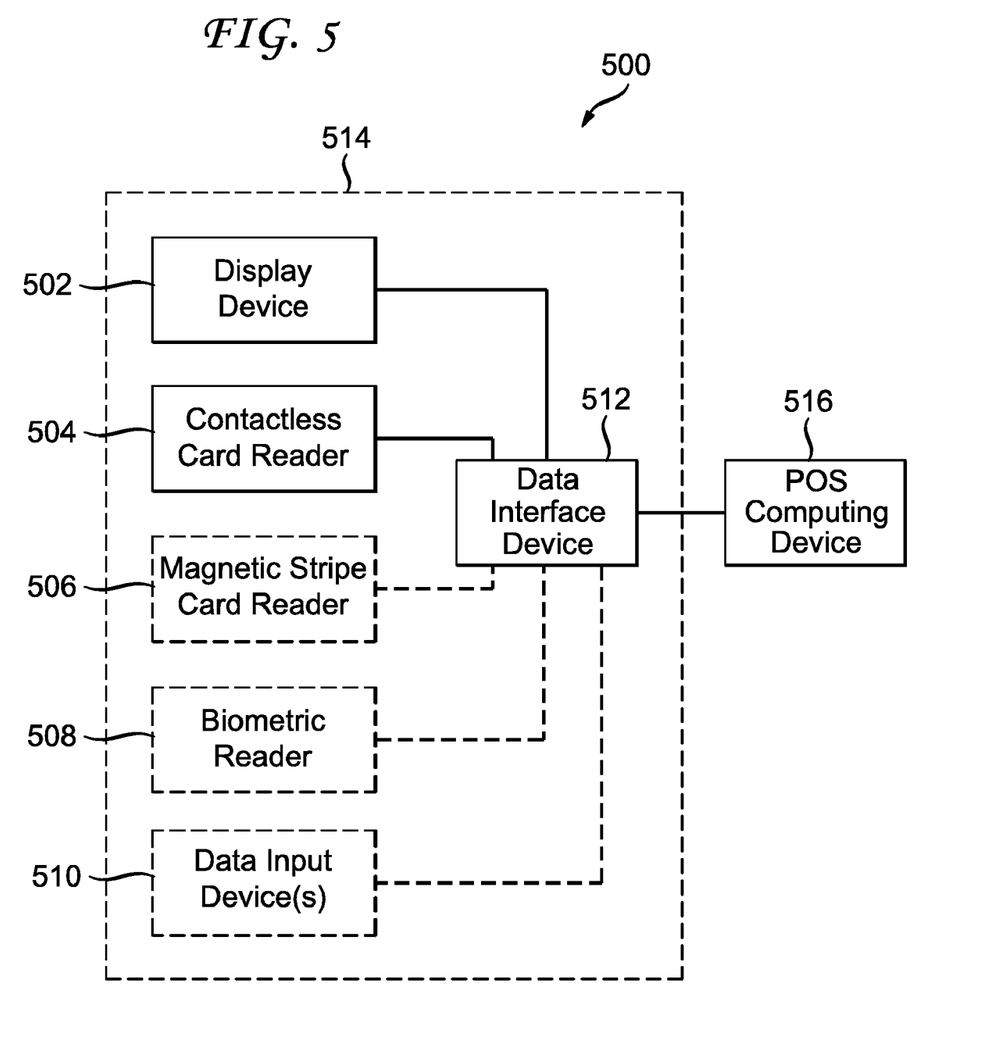
FIG. 5 illustrates a block diagram of an example point-of-sale system.

FIG. 5 illustrates a block diagram of an example point-of-sale system 500. As illustrated in FIG. 5, the example point-of-sale system 500 includes an integrated interface apparatus 514 and a point-of-sale (POS) computing device 516. The integrated interface apparatus 514 may be the example integrated interface apparatus 100, 200, 300 or 400 of FIG. 1, 2, 3 or 4 described hereinabove. The integrated interface apparatus 514 includes a display device 502, a contactless card reader 504, and various embodiments of integrated interface apparatus 514 may also include, a magnetic stripe card reader 506, a biometric reader 508 (e.g., fingerprint reader), as well other data input devices 510.

The other data input devices 510 may include a keypad/pin pad/keyboard, a barcode reader, a touch screen device, as well as any other data input devices. The keypad, pin pad and/or keyboard may be configured to receive alphanumeric or other types of data input in connection with security measures associated with a payment method (e.g., debit card pin code). The bar code reader may be configured to receive data input in connection a payment method (e.g., gift card) and/or an item code of a product for self checkout. The touch screen may be configured as a keypad, pin pad and/or keyboard, as described above. The data input devices may also be used differently than described and these uses are considered within the scope of this application.

The integrated interface apparatus 514 also includes a data interface device 512 configured to operatively connect the interface devices 502, 504, 506, 508, 510 of the integrated interface apparatus 514 to the POS computing device 516. The data interface device 512 may be a universal serial bus (USB) hub that operatively connects the interface devices 502, 504, 506, 508, 510 of the integrated interface apparatus 514 to the POS computing device 516.

The POS computing device 516 is configured to receive input data associated with a transaction (purchase/refund)

from the integrated interface apparatus 514 (e.g., resulting from a user inputting contactless card data, magnetic card data, biometric data, or other receivable input data). The POS computing device 516 is also configured to provide the user, via the display device 502, with information that includes information concerning inputting of input data (e.g., prompting and other information associated with the input data), as well as information concerning the transaction (e.g., item stock no., description of item, price of item, and other transaction-related information), such as user-level and/or cashier-level transaction information. The POS computing device 516 is further configured to verify the input data for the transaction (e.g., contactless card or magnetic stripe card verification, and/or biometric verification), such as by contacting a verification device (not shown) that may be local or remote to the POS computing device via a communication link, such as via a computer network (not shown).

Figure 6:
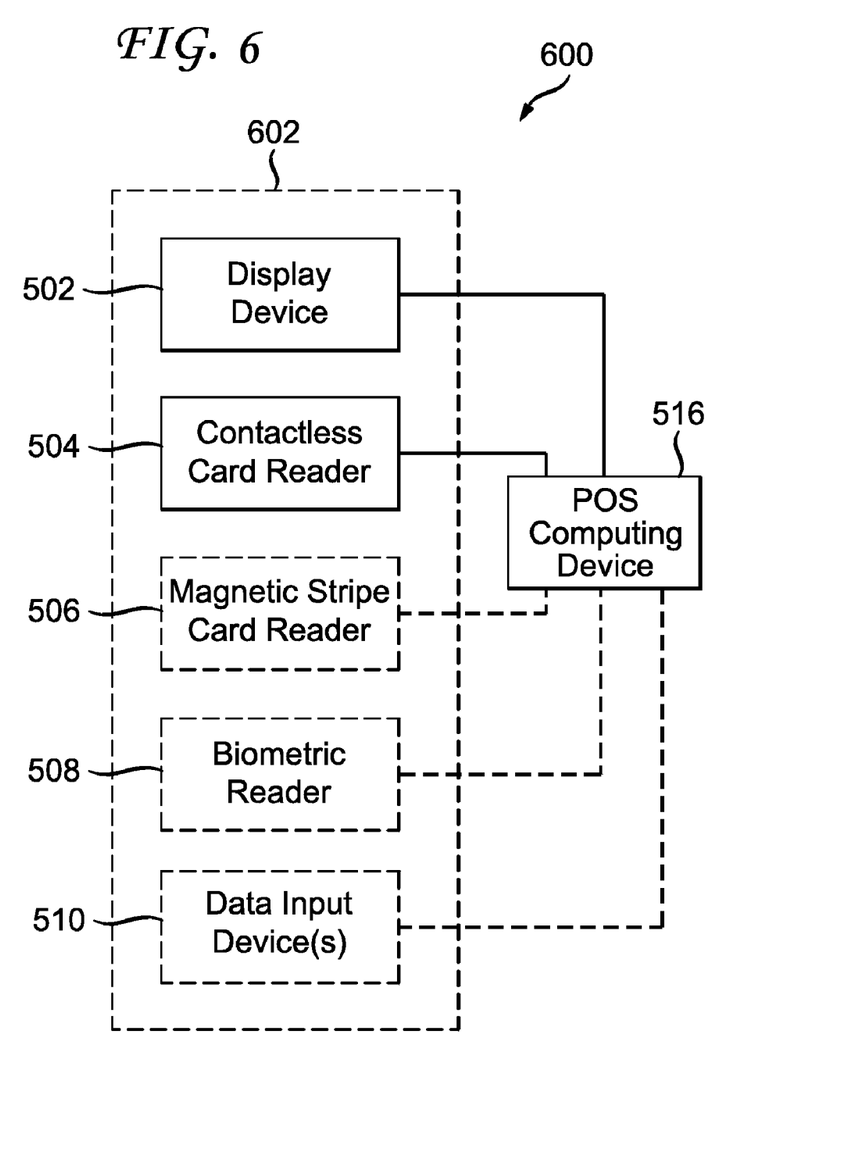
FIG. 6 illustrates a block diagram of another example point-of-sale system.

FIG. 6 illustrates a block diagram of another example point-of-sale system 600. As illustrated in FIG. 6, the example point-of-sale system 600 includes an integrated interface apparatus 602 and a point-of-sale (POS) computing device 516. The integrated interface apparatus 602 may be the example integrated interface apparatus 100, 200, 300 or 400 of FIG. 1, 2, 3 or 4 described hereinabove. The integrated interface apparatus 602 includes a display device 502, a contactless card reader 504, and various embodiments of integrated interface apparatus 602 may also include, a magnetic stripe card reader 506, a biometric reader 506 (e.g., fingerprint reader), as well other data input devices 510. The interface devices 502, 504, 506, 508 and 510 of the integrated interface apparatus 514 are independently connected to the POS computing device 516.

Figure 7:
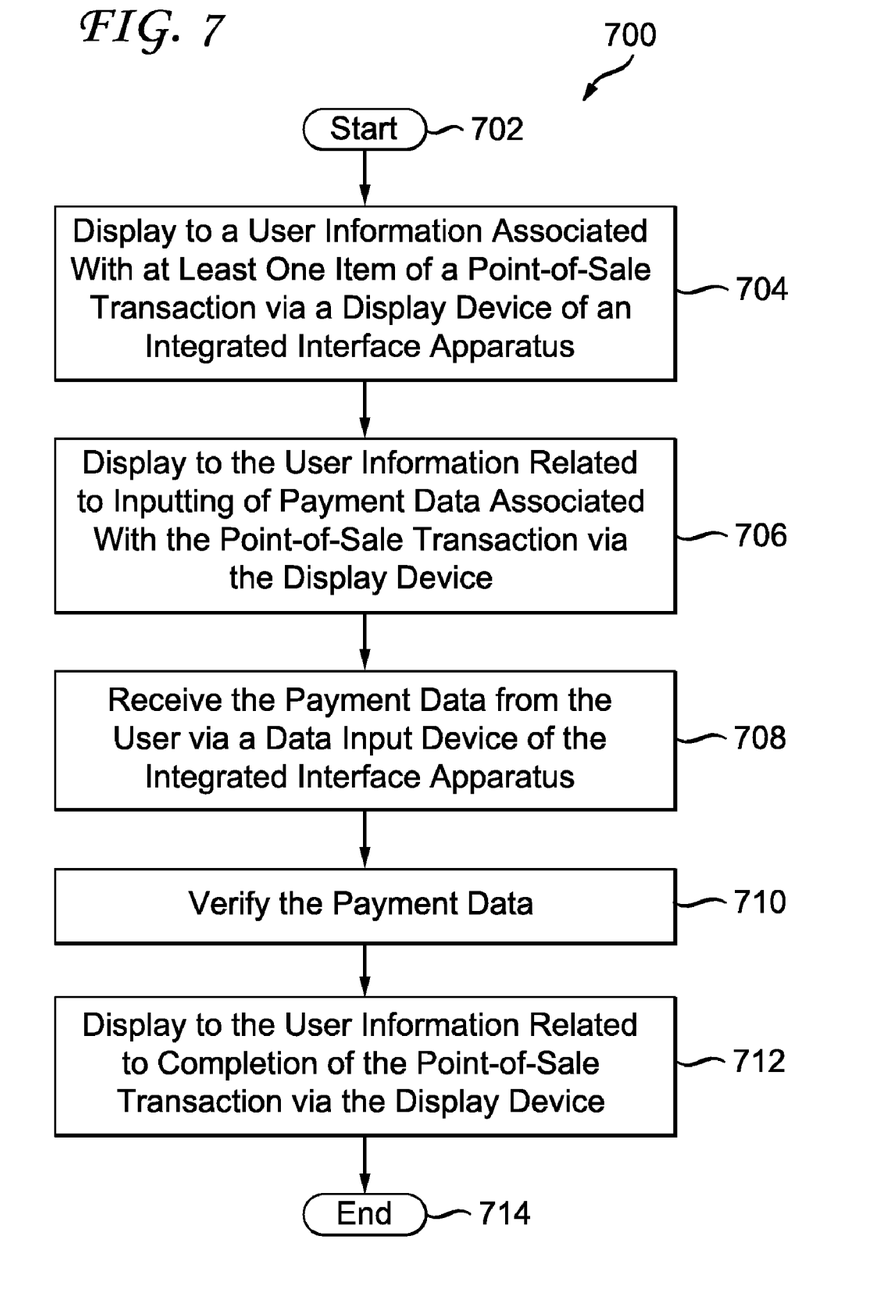
FIG. 7 is a flowchart that illustrates an example method of performing a point-of-sale transaction.

FIG. 7 is a flowchart that illustrates an example method 700 of performing a point-of-sale transaction. More specifically, the example method 700 starts at operation 702 at which a user requests a purchase transaction or a return transaction. At operation 704, information associated with at least one item of the point-of-sale transaction (being bought or returned) is displayed to the user via a display device of an example integrated interface apparatus. For example, a POS computing device 516 may display information on an item that the user is purchasing or returning via a display device 130 of an integrated interface apparatus 100 of FIG. 1. Other integrated interface apparatuses 200, 300 or 400 of FIG. 2, 3 or 4 may be used as an alternative to the integrated interface apparatus 100 of FIG. 1.

At operation 706, information related to inputting of payment data associated with the point-of-sale transaction is displayed to the user via the display device integrated interface apparatus 100 of FIG. 1. For example, the POS computing device 516 may display appropriate information related to inputting contactless card information, magnetic stripe card information or biometric information for the point-of-sale transaction. As an example, the POS computing device 516 may instruct the user via display device 130 to bring the user's contactless card in proximity to the contactless card reader 124 of the integrated data input device 122.

At operation 708, the payment data from the user is received via a data input device of the integrated interface apparatus. For example, account information from the user's contactless card is received by the POS computing device 516 via the contactless card reader 124. At operation 710, the payment is verified. For example, the POS computing device 516 verifies the payment data by contacting a verification device (not shown) that may be local or remote to the POS computing device 516 via a communication link, such as a computer network. Thereafter, information related to completion of the point-of-sale transaction is display to the user via the display device of the integrated interface apparatus. For example, the POS computing device 516 displays information concerning completion of the point-of-sale transaction via the display device 130 of the integrated interface apparatus 100.

The example method 700 described above illustrates that the display device of the integrated interface apparatus may be used for transaction-related information, as well as for data input information associated with a point-of-sale transaction. This advantageously alleviates the need for an extra cashier-level display device.

Figure 8:
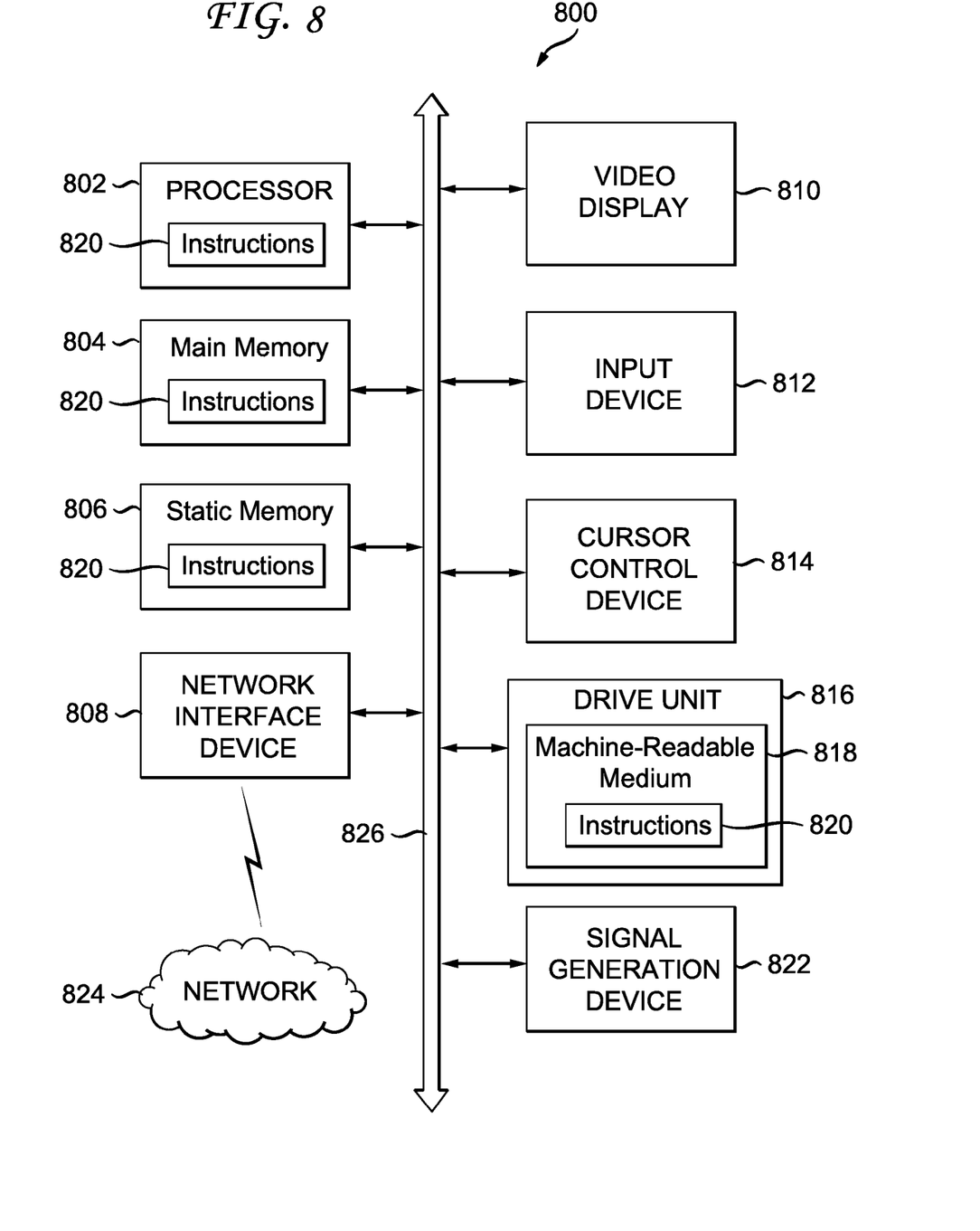
FIG. 8 is a block diagram of an illustrative embodiment of a general computer system.

FIG. 8 is a block diagram of an illustrative embodiment of a general computer system 800. The computer system 800 can include a set of instructions that can be executed to cause the computer system 800 to perform any one or more of the methods or computer based functions disclosed herein. The computer system 800, or any portion thereof, may operate as a standalone device or may be connected, e.g. using a network or other connection, to other computer systems or peripheral devices. For example, the computer system 800 may be operatively connected to one or more verification systems. As another example, the computer system may be operatively connected to any one or more of the integrated interface apparatuses described in reference to FIGS. 1-6 above.

In a networked deployment, the computer system 800 may operate in the capacity of a point-of-sale (POS) computing device. The computer system 800 may also be implemented as or incorporated into various devices, such as a personal computer (PC), a tablet PC, a personal digital assistant (PDA), a mobile device, a palmtop computer, a laptop computer, a desktop computer, a communications device, a control system, a web appliance, or any other machine capable of executing a set of instructions (sequentially or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 may include a main memory 804 and a static memory 806 that can communicate with each other via a bus 826. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 822, such as a speaker or remote control, and a network interface device 808.

In a particular embodiment, as depicted in FIG. 8, the disk drive unit 816 may include a computer-readable medium 818 in which one or more sets of instructions 820, e.g., software, can be embedded. Further, the instructions 820 may embody one or more of the methods or logic as described herein. In a particular embodiment, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations can include distributed processing, component/object distributed processing, and parallel processing. Alternatively, virtual computer system processing can be constructed to implement one or more of the methods or functionality as described herein.

It is also contemplated that a computer-readable medium includes instructions 820 or receives and executes instructions 820 responsive to a propagated signal, so that a device connected to a network 824 can communicate voice, video or data over the network 824. Further, the instructions 820 may be transmitted or received over the network 824 via the network interface device 808.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Although the present specification describes components and functions that may be implemented in particular embodiments with reference to particular standards and protocols, the invention is not limited to such standards and protocols. For example, standards for Internet and other packet switched network transmission (e.g. TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, an integrated interface apparatus for a point-of-sale system, an example point-of-sale system including the integrated interface apparatus, an example method and a computer-readable storage medium for performing a point-of-sale transaction have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An integrated interface apparatus of a point-of-sale system, the integrated interface apparatus comprising:
   a base member configured to be disposed on a counter space;
   a vertical arm member operatively connected to the base member, the vertical arm member including a terminal attachment member and a side attachment member below the terminal attachment member and above the base member, the side attachment member being configured to be secured to the vertical arm member at a plurality of different heights along the vertical arm member;
   a display device operatively connected to the terminal attachment member; and
   a data input device operatively connected to the side attachment member.

2. The integrated interface apparatus of claim 1, wherein the base member includes a plate configured to be secured to the counter space to provide stability and theft deterrence.

3. The integrated interface apparatus of claim 1, wherein the base member includes a vertical arm receiving member configured to secure the vertical arm member to the base member.

4. The integrated interface apparatus of claim 3, wherein the vertical arm receiving member includes a recess to receive the vertical arm member in the vertical arm receiving member, the vertical arm receiving member further including snap-in device configured to secure the vertical arm member in the recess of the vertical arm receiving member.

5. The integrated interface apparatus of claim 1, further comprising a data interface device configured to operatively connect the display device and the data input device to a point-of-sale computing device.

6. The integrated interface apparatus of claim 5, wherein the display device is configured to display information associated with at least one item of a point-of-sale transaction received from the point-of-sale computing device, the display device being further configured to display information related to input of payment data associated with the point-of-sale transaction via the data input device.

7. The integrated interface apparatus of claim 1, wherein the data input device includes at least one of a contactless card reader, a magnetic stripe card reader, and a biometric reader.

8. The integrated interface apparatus of claim 1, wherein the data input device is an integrated data input device that includes a contactless card reader, a magnetic stripe card reader, and a biometric reader.

9. A point-of-sale system, the point of sale system comprising:
   an integrated interface apparatus including:
      a base member configured to be disposed on a counter space;
      a vertical arm member operatively connected to the base member, the vertical arm member including a terminal attachment member and a side attachment member below the terminal attachment member and above the base member, the side attachment member being configured to be secured to the vertical arm member at a plurality of different heights along the vertical arm member;
      a display device operatively connected to the terminal attachment member; and
      a data input device operatively connected to the side attachment member; and
   a point-of-sale computing device operatively connected to the display device and the data input device.

10. The point-of-sale system of claim 9, wherein the integrated interface apparatus further includes a data interface device configured to operatively connect the display device and the data input device to the point-of-sale computing device.

11. The point-of-sale system of claim 9, wherein the data input device includes at least one of a contactless card reader, a magnetic stripe card reader, and a biometric reader.

12. The point-of-sale system of claim 9, wherein the display device is configured to display information associated with at least one item of a point-of-sale transaction received from the point-of-sale computing device, the display device being further configured to display information related to input of payment data associated with the point-of-sale transaction via the data input device.

13. The integrated interface apparatus of claim 1, wherein the terminal attachment member is configured to perform at least one of: rotate about an axis of the vertical arm member and tilt in relation to the vertical arm member.

14. The integrated interface apparatus of claim 1, wherein the side attachment member is configured to perform at least one of: rotate about an axis of the vertical arm member and tilt in relation to the vertical arm member.

15. The integrated interface apparatus of claim 5, wherein the data interface device is a universal serial bus (USB) hub disposed within the integrated interface apparatus.

16. The point-of-sale system of claim 9, wherein the terminal attachment member is configured to perform at least one of: rotate about an axis of the vertical arm member and tilt in relation to the vertical arm member.

17. The point-of-sale system of claim 9, wherein the side attachment member is configured to perform at least one of: rotate about an axis of the vertical arm member and tilt in relation to the vertical arm member.

18. The point-of-sale system of claim 10, wherein the data interface device is a universal serial bus (USB) hub disposed within the integrated interface apparatus.

19. The point-of-sale system of claim 11, wherein the data input device is an integrated input device that includes a contactless card reader, a magnetic stripe reader, and a biometric reader.

* * * * *